United States Patent [19]

Kinoshita

[11] 4,181,645

[45] Jan. 1, 1980

[54] ROOM-TEMPERATURE CURABLE ELASTIC COMPOSITION

[75] Inventor: Tatsuo Kinoshita, Yamaguchi, Japan

[73] Assignee: Mitsui Petrochemical Industries, Ltd., Tokyo, Japan

[21] Appl. No.: 954,786

[22] Filed: Oct. 26, 1978

[30] Foreign Application Priority Data

Oct. 31, 1977 [JP] Japan ................. 52-129663

[51] Int. Cl.$^2$ ............................................. C08K 5/15
[52] U.S. Cl. ........................... 260/42.28; 260/37 EP; 528/103; 528/123; 525/113
[58] Field of Search ............... 260/37 EP, 42.28, 836; 528/103, 123

[56] References Cited

U.S. PATENT DOCUMENTS

| | | | |
|---|---|---|---|
| 3,984,370 | 10/1976 | Shinohara et al. | 260/37 EP |
| 4,049,634 | 9/1977 | Ko et al. | 260/37 EP |
| 4,051,195 | 9/1977 | McWhorter | 260/836 |

FOREIGN PATENT DOCUMENTS

| | | |
|---|---|---|
| 51-101100 | 9/1976 | Japan . |
| 53-8043 | 1/1977 | Japan . |
| 53-18637 | 2/1978 | Japan . |

*Primary Examiner*—Lewis T. Jacobs

*Attorney, Agent, or Firm*—Sherman & Shalloway

[57] ABSTRACT

An elastic composition curable at room temperature comprising (A) a diamine of a specified structure having a molecular weight of about 5,000 to about 25,000, (B) a diepoxy compound in an amount such that the mole ratio of the epoxy groups in the diepoxy compound to the primary amino groups in diamine (A) is from 0.5 to 5.0, and (C) a mixture of (i) a diacrylic acid ester and/or a dimethacrylic acid ester and (ii) a tri- or higher polyacrylic acid and/or a tri- or higher polymethacrylic acid ester in which 5 to 90% of the acryloyl and/or methacryloyl groups are derived from the diacrylic and/or dimethacrylic acid ester, the amount of said mixture being such that the mole ratio of the sum of the acryloyl and methacryloyl groups in the mixture to the primary amino groups in diamine (A) is from 0.1 to 2.0, and as optional ingredients, at least one of (D) an inorganic filler, (E) a monoepoxy compound, (F) a curing promotor, (G) a viscosity controlling agent, (H) an organic filler, (I) an age resister, (J) a sag inhibitor, (K) an ultraviolet absorbent, and (L) an assistant sag inhibitor. Since the composition is deformable in conformity to changes in joint during the process of curing, it is useful to provide various sealing materials of good quality.

4 Claims, No Drawings

ROOM-TEMPERATURE CURABLE ELASTIC COMPOSITION

This invention relates to a low-toxic, room-temperature-curable elastic composition useful, for example, as a sealant or the like which is deformable in conformity to changes in joint during the process of curing, cures at a higher rate than do conventional compositions of this kind and after curing, gives various rubber elastomers of high elongation and low to high moduli which have equivalent or superior properties, such as extremely low toxicity, weatherability, ozone resistance, thermal stability, water resistance, chemical resistance, durability and adhesion, to conventional compositions.

More specifically, the invention relates to a room temperature-curable elastic composition comprising (A) a diamine having a molecular weight of about 5,000 to about 25,000 and expressed by the following formula

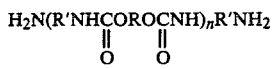

wherein R is a residue of a long-chain diol having a molecular weight of about 500 to about 15,000, R' is a group selected from the class consisting of alkylene, cycloalkylene and arylene, and n is an integer of 1 to 25, (B) a diepoxy compound in an amount such that the ratio of the moles of epoxy groups in the diepoxy compound to the moles of primary amino groups in the diamine (A) is from 0.5 to 5.0, (C) a mixture of (i) a diacrylic acid ester and/or a dimethacrylic acid ester and (ii) a tri- or higher polyacrylic acid and/or a tri- or higher polymethacrylic acid ester in which 5 to 90% of the acryloyl and/or methacryloyl groups are derived from the diacrylic and/or dimethacrylic acid ester, the amount of said mixture being such that the ratio of the total moles of the acryloyl and methacryloyl groups in the mixture to the moles of primary amino groups in the diamine (A) is from 0.1 to 2.0, (D) 0 to about 300 parts by weight, per 100 parts by weight of the total of the diamine (A), diepoxy compound (B) and mixture (C), of an inorganic filler, (E) a monoepoxy compound in an amount of 0 to 25 moles per mole of the primary amino groups in the diamine (A), (F) 0 to about 30 parts by weight, per 100 parts by weight of the total of the diamine (A), diepoxy compound (B) and mixture (C), of a curing promotor, (G) 0 to about 100 parts by weight, per 100 parts by weight of the total of the diamine (A), diepoxy compound (B) and mixture (C), of a viscosity controlling agent, (H) 0 to about 300 parts by weight, per 100 parts by weight of the total of the diamine (A), diepoxy compound (B) and mixture (C), of an organic filler, (I) 0 to about 30 parts by weight, per 100 parts by weight of the total of the diamine (A), diepoxy compound (B) and mixture (C), of an age-resister, (J) 0 to about 30 parts by weight, per 100 parts by weight of the total of the diamine (A), diepoxy compound (B) and mixture (C), of a sag inhibitor, (K) 0 to about 30 parts by weight, per 100 parts by weight of the total of the diamine (A), diepoxy compound (B) and mixture (C), of an ultraviolet absorbent, and (L) 0 to about 10 parts by weight, per 100 parts by weight of the total of the diamine (A), diepoxy compound (B) and mixture (C), of an assistant sag inhibitor.

The composition of this invention is useful as various sealants such as a caulking material, roofing material, floor coating material, ceiling coating material, or wall coating material.

U.S. Pat. No. 3,984,370 of which inventorship includes the present inventor as a coinventor discloses a room temperature-curable elastic composition comprising the aforesaid ingredients (A), (B), (D), (F), (G) and (H). This composition has good processability and gives cured products of good properties, and can be used as a superior elastic sealing material. Elastic sealing materials, in the finally cured state, have elasticity and perform complete sealing in conformity to changes in joint. Since in actual use, the joint changes even during the process of curing, the sealant material should be able to conform to changes in joint until it cures to an elastomer. It has been found that the composition disclosed in the prior patent cited above has excellent elasticity in the finally cured state, but since its elongation is low during the curing step, it cannot conform to great changes in joint.

Japanese Laid-Open Patent Publication No. 101100/76 discloses a curable resin composition comprising (X) at least one epoxy resin having at least one epoxy group per molecule, (Y) at least one oligomeric (meth)acrylate containing at least two (meth)acryloyl groups, or both one (meth)acryloyl group and at least one hydroxyl and/or carboxyl group, per molecule, and having a molecular weight of not more than 10,000 which is not more than 1,000 per (meth)acryloyl group and a boiling point at atmospheric pressure of at least 200° C., and being free from a spirane ring in the molecule, the proportion of the acryloyl groups being 5 to 100 mole% based on the total amount of the acryloyl and methacryloyl groups, and (Z) at least one polyamine containing a primary and/or secondary amino group in which the amount of active hydrogen atoms is 0.3 to 7.0 equivalents to the sum of the epoxy groups and (meth)acryloyl groups combined; in which the epoxy resin (X) and/or the oligomeric (meth)acrylate (Y) and the polyamine (Z) at least partially may form a reaction product.

The diamine (A) used in the present invention is not specifically disclosed in the above-cited Patent Publication as the polyamine (Z). The composition of this prior Publication does not have enough ability to be deformed in conformity to changes in joint, and moreover, has very strong toxicity. A cured product of this composition is hard and has little elongation, thus being completely devoid of rubber elasticity which is essential to elastic sealing material.

The present inventor made investigations in order to remove the defects of the prior techniques described above and to provide a curable elastic composition which has the advantage of being deformable conveniently in conformity to changes in joint during the process of curing, and after curing, possesses superior or equivalent properties to the conventional compositions.

It has been found consequently that a composition comprising the specified diamine (A), the specified amount of diepoxy compound (B) and the specified amount of the mixture (C) of (i) and (ii) as a base and optionally containing the inorganic filler (D), the monoepoxy compound (E) and other additives (F) to (L) can conveniently conform to changes in joint during the process of curing, and after curing, possesses superior properties.

It has also been found that the inclusion of the monoepoxy compound (E) brings about the advantage of increasing resistance to degradation by ozone and shortening the tack-free time without any deleterious effect on the properties of the composition during and after curing.

In particular, it has been found that the composition of this invention has an elongation at break (Eb-168) in the later stage of curing (after 168 hours) of at least about 290% and its modulus at 50% elongation ($M_{50}$-8), tensile strength at break (Tb-8) and elongation at break (Eb-8) in the initial stage of curing (after 8 hours) are more than zero; for example, it has an Eb-168 of at least about 290%, a Tb-8 of at least 0.1 kg/cm$^2$ and an Eb-8 of at least 650%, and because of these good properties during the process of curing, the composition can conveniently conform to changes in joint, and does not show cracks or crazes.

It is an object of this invention therefore to provide an improved room temperature-curable elastic composition which can conform to changes in joint during the process of curing, and after curing, possesses superior or equivalent properties to the conventional compositions.

The above and other objects and advantages of the invention will become more apparent from the following description.

The ingredient (A) of the composition of this invention is a diamine having a molecular weight of about 5,000 to about 25,000 and expressed by the following formula

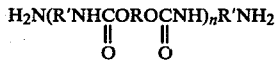

wherein R is a residue of a long-chain diol having a molecular weight of about 500 to about 15,000, R' is a group selected from alkylene, cycloalkylene and arylene, and n is an integer of 1 to 25.

Preferred R groups are residues of polyoxyalkylene glycols, diol derivatives of hydrocarbon polymers or copolymers and polyester diols derived from aliphatic carboxylic acids or their anhydrides and alkylene glycols. Preferably, R' is selected from the group consisting of alkylenes of 2 to 12 carbon atoms and arylenes of 6 to 14 carbon atoms.

Specific examples of compounds expressed by HOROH from which these diol residues are derived are polyoxyalkylene glycols such as polyoxypropylene glycol, polyoxyethylenepolyoxypropylene glycol, polyoxybutylene glycol and polyoxypentamethylene glycol, diols of hydrocarbon polymers such as polybutadiene diol, polybutadieneacrylonitrile diol, polybutadiene-styrene diol, polyisoprene diol and polyisobutylene diol, and long-chain diols composed mainly of aliphatic bonds such as polyester diols obtained by copolymerizing aliphatic dicarboxylic acids or their anhydrides with diols.

The alkylene group for R' is a term embracing a cycloalkylene group, and the arylene for R' includes phenylene and naphthylene which may contain a lower alkyl group as a substituent. Or they may contain a urethane linkage within the molecule.

Specific examples of compounds OCNR'NCO from which R' is derived are tolylene diisocyanate, 4,4'-diphenylmethane diisocyanate, dianisidine diisocyanate, meta-xylylene diisocyanate, 1,5-naphthalene diisocyanate, trans-vinylene diisocyanate, and hexamethylene diisocyanate.

If the molecular weight of the long-chain diol is too low, the elastic property of the resulting composition is degraded, and when the molecular weight is too high, the resulting diamine, too, has a high molecular weight and thus retards curing. Accordingly, the long-chain diols should have a molecular weight of about 500 to about 15,000, preferably about 1,000 to about 12,000. Preferably, R' is aliphatic.

The n in the above formula, which differs according to the molecular weight of R or R', is selected so that the molecular weight of the resulting diamine (A) becomes about 5,000 to about 25,000, preferably about 10,000 to about 20,000. If the molecular weight of the diamine (A) is too low, the elastic property of the resulting composition is degraded, and when the molecular weight is too high, it retards the curing of the composition.

Examples of preferred diepoxy compounds (B) used in the composition of this invention are those derived from compounds selected from bisphenol A, its alkylene oxide adducts (for example, $C_2$–$C_6$, preferably $C_2$–$C_4$ alkylene oxide adducts), alkylene glycols (for example, $C_2$–$C_6$, preferably $C_2$–$C_4$ alkylene glycols), phthalic acid and p-hydroxybenzoic acid and compounds selected from epichlorohydrin and β-methylepichlorohydrin. Preferably, these diepoxy compounds (B) have a molecular weight of about 200 to about 1,000. Specific examples of these diepoxy compounds are bisphenol A glycidyl ethers derived from bisphenol A and epichlorohydrin or β-methylepichlorohydrin, polyalkylene glycol diglycidyl ethers derived from polyoxypropylene glycols and epichlorohydrin or β-methylepichlorohydrin, phthalic acid diglycidyl esters derived from phthalic acid and epichlorohydrin or β-methylepichlorohydrin, glycidyl ether esters derived from p-hydroxybenzoic acid and epichlorohydrin or β-methylepichlorohydrin, and glycidyl ethers derived from an ethylene oxide adduct of bisphenol A and epichlorohydrin or β-methylepichlorohydrin.

In the composition of this invention, the diepoxy compound (B) is used in an amount such that the ratio of the moles of epoxy groups in the diepoxy compound to the moles of primary amino groups in the diamine (A) is from 0.5 to 5, preferably from 0.6 to 4.0, and more preferably from 0.7 to 3.0.

The ingredient (C) of the composition of this invention is a mixture consisting of (i) a diacrylic and/or dimethacrylic acid ester and (ii) a tri- or higher polyacrylic and/or polymethacrylic acid ester, in which 5 to 90%, preferably 10 to 70%, more preferably 10 to 60%, of the acryloyl and/or methacryloyl groups are derived from the diacrylic and/or dimethacrylic acid ester. Specifically, 5 to 90% of acryloyl groups $CH_2$=CHCO— and/or methacryloyl groups $CH_2$=C(CH$_3$)CO— in the mixture are derived from the diacrylic acid ester or dimethacrylic acid ester. The remaining groups in the mixture are derived from a tri- or higher oligo-acrylic acid ester and/or oligo-methacrylic acid ester. If the diester (i) alone is used or its amount exceeds the above-specified range, the rate of curing of the composition is slow, and the cured product becomes tacky. When the amount of the diester is smaller than the specified amount, the elastic properties of the cured product are reduced and it becomes hard and brittle.

The di-ester (i) or tri- or higher ester (ii) of the oligomeric acrylate and/or methacrylate has a molecular weight of preferably not more than about 10,000, more preferably not more than about 5,000. Suitable esters that can be used are those obtained from aliphatic, alicyclic or aromatic polyhydric alcohols and acrylic acid and/or methacrylic acid. The polyhydric alcohols may contain a functional group such as an ether linkage, ester linkage, amide linkage or urethane linkage within the molecule.

Examples of the polyhydric alcohols which form such esters include polyhydric alcohols such as ethylene glycol, propylene glycol, butanediol, hexanediol, neopentyl glycol, cyclohexanediol, cyclohexanedimethanol, xylylene glycol, hydrogenated bisphenol A, trimethylol propane, glycerol, sorbitol and pentaerythritol; polyhydric alcohols containing an ether linkage such as diethylene glycol, triethylene glycol, tetraethylene glycol, polyethylene glycol, dipropylene glycol, polypropylene glycol, an ethylene oxide adduct of trimethylol propane, an ethylene oxide adduct of glycerol and an ethylene oxide adduct of bisphenol A; polyhydric alcohols containing an ester linkage such as a polyester diol between succinic acid and ethylene glycol, a polyester diol between maleic acid and ethylene glycol, a polyester diol between phthalic acid and diethylene glycol, a polyester diol between adipic acid and trimethylene glycol, and a polyester polyol between tetrahydrophthalic acid and trimethylol propane; and polyols containing a urethane linkage such as a polyurethane diol between ethylene glycol and hexamethylene diisocyanate, a polyurethane diol between trimethylol propane and tolylene diisocyanate and a polyurethane polyol between diethylene glycol and meta-xylylene diisocyanate.

The amount of the mixture (C) is such that the ratio of the moles of the total acryloyl and methacryloyl groups in the mixture (C) to the moles of primary amino groups in the diamine (A) is from 0.1 to 2.0, and preferably from 0.5 to 1.5.

Basically, the room temperature-curable elastic composition of this invention comprises the diamine (A), the diepoxy compound (B) and the mixture (C) of the esters (i) and (ii).

It is not always necessary to blend these ingredients (A), (B) and (C) simultaneously. For example, the ingredient (C) may be incorporated in advance into the ingredient (A) and/or the ingredient (B). When the ingredient (C) is added to the ingredient (A) in advance, they react with each other. The ingredients (A), (B) and (C) may be mixed in the form of emulsions.

In addition to the basic ingredients (A), (B) and (C), the room temperature-curable elastic composition of this invention may further include up to 300 parts by weight, per 100 parts by weight of the total of the diamine (A), the diepoxy compound (B) and the mixture (C) of the esters (i) and (ii), of an inorganic filler (D). The amount of the inorganic filler (D) is preferably about 10 to about 300 parts by weight, more preferably about 20 to about 300 parts by weight, per 100 parts by weight of the total of the ingredients (A), (B) and (C).

The addition of the inorganic filler (D) improves such properties as tensile strength, elongation and age resistance.

Examples of the inorganic filler (D) are carbon black, silica, finely divided anhydrous silica, zinc oxide, titanium dioxide, magnesium oxide, calcium oxide, magnesium carbonate, calcium carbonate, barium carbonate, barium sulfate, magnesium sulfate, calcium sulfate, sand, cement, perlite, talc, clay, alumina white, asbestos, diatomaceous earth and glass fibers.

Pigments such as lithopone, white lead, cadmium yellow, chrome yellow, Titan Yellow, ochre, chrome vermillion, chrome orange, umbers, yellow iron oxide, red iron oxide, cadmium red, red lead, prussian blue, ultramarine, cobalt blue, mineral violet, cobalt violet, and black iron oxide can also be incorporated in an amount of 0 to 5 parts by weight per 100 parts by weight of the total of the ingredients (A), (B) and (C).

The composition of this invention may further include a monoepoxy compound (E) in an amount of up to 2.5 moles per mole of primary amino groups in the diamine (A). This is desirable for increasing the resistance to ozone degradation and shortening the tack-free time.

Examples of the monoepoxy compound (E) include glycidyl ethers such as phenyl glycidyl ether, allyl glycidyl ether, butyl glycidyl ether and lower alkyl-substituted phenyl glycidyl ether; olefin oxides such as styrene oxide, vinylcyclohexane monoxide, dipentene monooxide and α-pinene oxide; and glycidyl esters such as glycidyl acrylate, glycidyl methacrylate, and glycidyl esters or carboxylic acids.

The room temperature-curable elastic composition of this invention may further comprise additives (F) to (L) in the specified amounts.

(F) 0 to about 30 parts by weight, per 100 parts by weight of the total of the ingredients (A), (B) and (C), of a curing promotor;

(G) 0 to about 100 parts by weight, per 100 parts by weight of the total of the ingredients (A), (B) and (C), of a viscosity controlling agent;

(H) 0 to about 300 parts by weight, per 100 parts by weight of the total of the ingredients (A), (B) and (C), of an organic filler;

(I) 0 to about 30 parts by weight, per 100 parts by weight of the total of the ingredients (A), (B) and (C), of an age-resister;

(J) 0 to about 30 parts by weight, per 100 parts by weight of the total of the ingredients (A), (B) and (C), of a sag inhibitor;

(K) 0 to about 30 parts by weight, per 100 parts by weight of the total of the ingredients (A), (B) and (C), of an ultraviolet absorbent, and (L) 0 to about 10 parts by weight, per 100 parts by weight of the ingredients (A), (B) and (C), of an assistant sag inhibitor.

The curing promotor (F) includes, for example, water, phenol, phenol derivatives, and mono- or polyhydric alcohols. Examples of the phenol derivatives are cresol, resorcinol, catechol, hydroquinone, dimethylaminomethyl phenol and tris(dimethylaminomethyl)phenol. Examples of the alcohols are ethanol, propanol, butanol, ethylene glycol, and glycerol.

Examples of the viscosity controlling agent (G) are polyoxyalkylene glycols such as polyoxyethylene glycol and polyoxypropylene glycol; phthalic acid esters, preferably $C_1$–$C_{20}$ alkyl esters of phthalic acid such as diethyl phthalate, dibutyl phthalate, dioctyl phthalate, dinonyl phthalate, diisodecyl phthalate and dicyclohexyl phthalate; epoxy plasticizers such as epoxidized linseed oil, butyl epoxystearate, benzyl epoxystearate, epoxidized soybean oil and dioctyl epoxyhexahydrophthalate; phosphoric acid esters such as tricresyl phosphate, trioctyl phosphate and diphenyl cresyl phosphate; polyvinyl alcohol; and starch, trioctyl trimellitate and ethyl phthallyl ethyl glycolate.

Examples of the organic filler (H) was phenolic resins, petroleum resins, styrene-butadiene rubber, natural rubber, polybutadiene rubber, asphalt, tar, pitch, natural pulp, synthetic organic pulp, and wood chips.

Examples of the age-resistor (I) include N-arylnaphthyl amines such as N-phenyl-$\alpha$-naphthyl amine, and N-phenyl-$\beta$-naphthyl amine; N,N'-aryl-p-phenylene diamines such as N,N'-di-$\alpha$-naphthyl-p-phenylene diamine, N,N'-di-$\beta$-naphthyl-p-phenylene diamine and N,N'-diphenyl-p-phenylene diamine; unsaturated ethers such as Antiozonant AFD (a trademark for a product of Bayer AG); and phenols such as hydroquinone monomethyl ether, styrenated phenol, styrenated cresol, 2,5-di-t-butyl hydroquinone, 2,6-di-t-butyl-p-cresol, 2,2'-methylenebis(4-methyl-6-t-butylphenol), and octadecyl $\beta$-(3,5-di-t-butyl-4-hydroxyphenyl)propionate.

The sag inhibitor (J) includes, for example, hydrogenated castor oil, a dehydrocondensation product between D-sorbitol and benzaldehyde, finely divided silica, maleinized wax, a metal salt of maleinized wax, orven, bentonite, and oxidized waxes.

The ultraviolet absorvent (K) includes, for example, 2,4-dihydroxybenzophenone, 2-hydroxy-4-methoxybenzophenone, 2-(2-hydroxy-5-methylphenyl)benzotriazole, 2-(2'-hydroxy-3',5'-di-t-butylphenyl)benzotriazole, and 2-(2'-hydroxy-3',5'-alkyl)benzotriazole.

Examples of the assistant sag inhibitor (L) are polyamines such as ethylene diamine, diethylenetriamine, triethylene tetramine, tetraethylene pentamine, hexamethylene diamine and piperazine.

These additives can be incorporated into the composition of this invention at any stage of blending the ingredients (A), (B) and (C) or after blending them.

Blending means for the preparation of the composition of this invention can be selected freely. For example, devices for kneading the basic ingredients or curing agent ingredients include an agitated grinder, a kneader, a three-roll mill, an agitated mixer, a colloid mill, a ribbon blender, and an intensive mixer. The basic ingredients and the curing agent ingredients can be mixed by hand, or by an electrically driven stirrer. The recommended sequence of mixing is to add the diamine (A) to a mixture of the diepoxy compound (B) and the ester mixture (C), or to add the diepoxy compound (B) to a mixture of the diamine (A) and the ester mixture (C).

The diamine (A) used in this invention can be easily prepared, for example, by the method disclosed in Japanese Laid-Open Patent Publication No. 95908/74, which comprises reacting a polyisocyanate having a plurality of

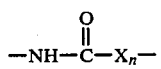

groups in one molecule, wherein X is O or S, and n is 0 or 1, with at least an equivalent, based on the isocyanate group, of a strong acid and water, and then treating the reaction product with alkali.

The following Examples and Comparative Examples illustrate the present invention in greater detail.

EXAMPLE 1

Fifty grams of a diamine of the formula given hereinabove in which R represents a residue of polyoxypropylene glycol having a molecular weight of 3,000 and R' represents a hexamethylene group and which has a number average molecular weight of 15,000, 18 g of calcium carbonate, 12 g of talc, 1.5 g of a pigment, 0.5 g of a curring promotor TAP (a product of Kayaku Noury Co., Ltd.), 1 g of finely divided silica and 2.0 g of hydrogenated caster oil as a sag inhibitor, 0.1 g of triethylenetetramine and 0.1 g of piperadine as an assistant sag inhibitor, and 15 g of a diluent PPG-400 (a trademark for a product of Mitsui Toatsu Co., Ltd.) were kneaded in a stirred grinder to form a basic composition. Separately, a curing agent was prepared by kneading in a mortar 2.3 g of a bisphenol A-type epoxy resin (EPOMIK R-140, a trademark for a product of Mitsui Petrochemical Epoxy Co., Ltd.), 0.8 g of an acrylate ester of a polyester polyol between trimethylol propane and tetrahydrophthalic acid (ARONIX M-8030, a trademark for a product of Toa Gosei Co., Ltd.; molecular weight 351; acryloyl groups 3.2, the acryloyl group equivalent actually measured 125), 0.4 g of an acrylate ester of a polyester diol between ortho-phthalic acid and diethylene glycol (ARONIX M-6100, a trademark for a product of Toa Gosei Co., Ltd.; molecular weight 450, acryloyl groups 2, the acryloyl group equivalent actually measured 230), 3 g of an age-resister and 3.4 g of calcium carbonate. The basic composition and curing agent were mixed well, and H-type samples were prepared in accordance with JIS A-5757 using a mortar test piece. The relation of the aging time at 25° C. to tensile strength and elongation was examined. The tensile test was performed at 25° C. at a pulling speed of 5 mm/min. using an autograph.

EXAMPLE 2

A curing agent was prepared in accordance with the procedure of Example 1 from 2.3 g of an epoxy resin (EPOMIK R-140), 0.5 g of an acrylate ester (ARONIX M-8030), 1.0 g of an acrylate ester (ARONIC M-6100), 3 g of an age-resister, and 3.2 g of calcium carbonate. Samples were prepared in the same way as in Example 1, and tested in the same way as in Example 1.

EXAMPLE 3

Example 1 was repeated except that the curing agent ingredient was prepared from 2.3 g of an epoxy resin (EPOMIK R-140), 0.3 g of an acrylate ester (ARONIX M-8030), 1.4 g of an acrylate ester (ARONIX M-6100), 3 g of an age-resister and 3.0 g of calcium carbonate.

COMPARATIVE EXAMPLE 1

Example 1 was repeated except that the curing agent was prepared from 3.9 g of an epoxy resin (EPOMIK R-140), 3 g of an age-resister, and 3.1 g of calcium carbonate.

COMPARATIVE EXAMPLE 2

Example 1 was repeated except that the curing agent was prepared from 2.3 g of an epoxy resin (EPOMIK R-140), 1.0 g of an acrylate ester (ARONIX M-8030), 3 g of an age-resister, and 3.6 g of calcium carbonate.

COMPARATIVE EXAMPLE 3

Example 1 was repeated except that the curing agent was prepared from 2.3 g of an epoxy resin (EPOMIK R-140), 1.9 g of an acrylate ester (ARONIX M-6100), 3 g of an age-resister, and 2.7 g of calcium carbonate.

EXAMPLE 4

Example 1 was repeated except that in the preparation of the curing agent, the amount of the epoxy resin (EPOMIK R-140) was changed to 1.8 g.

EXAMPLE 5

Example 1 was repeated except that in the preparation of the curing agent, the amount of the epoxy resin (EPOMIK R-140) was changed to 1.5 g.

EXAMPLE 6

Example 1 was repeated except that in the preparation of the curing agent, the amount of the epoxy resin (EPOMIK R-140) was changed to 1.2 g.

EXAMPLE 7

Example 1 was repeated except that the curing agent was prepared from 2.6 g of the epoxy resin (EPOMIK R-140), 0.7 g of an acrylate ester (ARONIX M-8030), 0.3 g of an acrylate ester (ARONIX M-6100), 3 g of an age-resister and 3.4 g of calcium carbonate.

EXAMPLE 8

Example 1 was repeated except that the curing agent was prepared from 2.8 g of an epoxy resin (EPOMIK R-140), 0.5 g of an acrylate ester (ARONIX M-8030), 0.3 g of an acrylate ester (ARONIX M-6100), 3 g of an age-resister and 3.4 g of calcium carbonate.

EXAMPLE 9

A basic composition was prepared in the same way as in Example 1 except that 50 g of a diamine of the general formula given hereinabove which had a number average molecular weight of 10,300 and in which R represents a residue of polyoxypropylene glycol having a molecular weight of 3,000 and R' represents hexamethylene group was used instead of the diamine in Example 1. Separately, a curing agent was prepared from 2.9 g of an epoxy resin (EPOMIK R-140), 1.2 g of an acrylate ester (ARONIX M-8030), 0.5 g of an acrylate ester (ARONIX M-6100), 3 g of an age-resister, and 3.2 g of calcium carbonate. The basic composition and the curing agent were well mixed, and the composition was tested in the same way as in Example 1.

EXAMPLE 10

A basic composition was prepared in the same way as in Example 1 except that 50 g of a diamine of the general formula given hereinabove which had a number average molecular weight of 10,100 and in which R represents a residue of polyoxypropylene glycol having a molecular weight of 1,000 and R' represents a hexamethylene group was used instead of the diamine used in Example 1. Separately, a curing agent was prepared from 2.9 g of an epoxy resin (EPOMIK R-140), 1.2 g of an acrylate ester (ARONIX M-8030), 0.5 g of an acrylate ester (ARONIX M-6100), 3, g of an age-resister, and 3.2 g of calcium carbonate. The basic composition was well mixed with the curing agent, and the composition was tested in the same way as in Example 1.

COMPARATIVE EXAMPLE 4

A basic composition was prepared in the same way as in Example 1 except that 50 g of a diamine of the formula given hereinabove which had a number average molecular weight of 3,800 and in which R represents a residue of polyoxypropylene glycol having a molecular weight of 1,000 and R' represents a hexamethylene group instead of the diamine used in Example 1. Separately, a curing agent was prepared from 6.0 g of an epoxy resin (EPOMIK R-140), 2.8 g of an acrylate ester (ARONIX M-8030), 1.3 g of an acrylate ester (ARONIX M-6100), 3 g of an age-resister, and 3.2 g of calcium carbonate. The basic composition and the curing agent were well mixed, and the composition was tested in the same way as in Example 1.

COMPARATIVE EXAMPLE 5

A basic composition was prepared by kneading 6.8 g of triethylene tetramine (molecular weight 146) and 0.5 g of a curing promotor TAP by an agitated grinder. Separately, a curing agent was prepared from 35.8 g of an epoxy resin (EPOMIK R-140), 9.3 g of an acrylate ester (ARONIX M-8030), 4.3 g of an acrylate ester (ARONIX M-6100), 18 g of calcium carbonate, 12 g of talc, 1.5 g of a pigment, 3 g of a sag inhibitor, 15 g of a diluent PPG-400, and 3 g of an age-resister. The basic composition and the curing agent were well mixed, and the composition was tested in the same way as in Example 1.

COMPARATIVE EXAMPLE 6

Example 1 was repeated except that in the preparation of the curing agent, the amount of the epoxy resin (EPOMIK R-140) was changed to 0.5 g.

COMPARATIVE EXAMPLE 7

Example 1 was repeated except that the amount of the epoxy resin (EPOMIK R-140) in the preparation of the curing agent was changed to 11.5 g.

COMPARATIVE EXAMPLE 8

A basic composition was prepared in the same way as in Example 1 except that 50 g of a diamine of the formula given hereinabove which had a number average molecular weight of 35,000 and in which R represents a residue of polyoxypropylene glycol having a molecular weight of 3,000 and R' represents a hexamethylene group was used instead of the diamine used in Example 1. Separately, a curing agent was prepared from 1.5 g of an epoxy resin (EPOMIK R-140), 0.4 g of an acrylate ester (ARONIX M-8030), 0.2 g of an acrylate ester (ARONIX M-6100), 3 g of an age-resister and 3.2 g of calcium carbonate. The basic composition and the curing agent were mixed well, and the composition was tested in the same way as in Example 1.

COMPARATIVE EXAMPLE 9

Example 1 was repeated except that in the preparation of the curing agent, the amount of the epoxy resin (EPOMIK R-140) was changed to 3.8 g, and 0.05 g of an acrylate ester (ARONIX M-8030) and 0.02 g of an acrylate ester (ARONIX M-6100) were used instead of the acrylate esters used in Example 1.

COMPARATIVE EXAMPLE 10

Example 1 was repeated except that in the preparation of the curing agent, 2.7 g of an acrylate ester (ARONIX M-8300) and 1.2 g of an acrylate ester (ARONIX M-6100) were used instead of the acrylate esters used in Example 1.

The results obtained in Examples 1 to 10 and Comparative Examples 1 to 10 and other data are shown in Table 1.

Table 1

| Example (Ex.) or Comparative Example (CEx.) | Diamine (A) Molecular weight | Molecular weight of R | Diepoxide (B) Mole ratio of epoxy groups to primary amino groups | Esters (C) Mole Ratio of acryloyl groups in the diester to entire acryloyl groups | Mole Ratio of acryloyl groups to primary amino groups | Aging time (hr) | $M_{50}$ (kg/cm$^2$) | $T_b$ (kg/cm$^2$) | $E_b$ (%) | Properties during curing |
|---|---|---|---|---|---|---|---|---|---|---|
| Ex. 1 | 15,000 | 3,000 | 1.8 | 0.2 | 1.2 | 8 | 0.2 | 0.8 | 730 | |
| | | | | | | 24 | 0.9 | 6.4 | 720 | |
| | | | | | | 48 | 1.5 | 7.3 | 510 | |
| | | | | | | 72 | 1.5 | 7.4 | 490 | |
| | | | | | | 168 | 2.8 | 10.0 | 330 | |
| Ex. 2 | " | " | " | 0.5 | " | 8 | 0.1 | 0.6 | 770 | |
| | | | | | | 24 | 0.6 | 4.0 | 740 | |
| | | | | | | 48 | 1.1 | 6.4 | 590 | |
| | | | | | | 72 | 1.4 | 7.0 | 510 | |
| | | | | | | 168 | 2.8 | 9.4 | 380 | |
| Ex. 3 | " | " | " | 0.7 | " | 8 | 0.1 | 0.2 | 980 | |
| | | | | | | 24 | 0.1 | 0.3 | 770 | |
| | | | | | | 48 | 0.9 | 4.2 | 630 | |
| | | | | | | 72 | 1.1 | 6.5 | 580 | |
| | | | | | | 168 | 2.0 | 8.8 | 430 | |
| Ex. 4 | " | " | 1.4 | 0.2 | " | 8 | 0.1 | 0.6 | 850 | |
| | | | | | | 24 | 0.6 | 6.1 | 810 | |
| | | | | | | 48 | 1.0 | 6.8 | 630 | |
| | | | | | | 72 | 1.3 | 7.6 | 560 | |
| | | | | | | 168 | 1.5 | 7.5 | 480 | |
| Ex. 5 | " | " | 1.2 | 0.2 | 1.2 | 8 | 0.1 | 0.7 | 950 | |
| | | | | | | 24 | 0.6 | 3.4 | 890 | |
| | | | | | | 48 | 0.8 | 4.5 | 740 | |
| | | | | | | 72 | 1.0 | 5.8 | 700 | |
| | | | | | | 168 | 1.1 | 6.5 | 680 | |
| Ex. 6 | " | " | 0.9 | " | " | 8 | 0.1 | 0.8 | 1100 | |
| | | | | | | 24 | 0.3 | 3.5 | 990 | |
| | | | | | | 48 | 0.6 | 4.3 | 870 | |
| | | | | | | 72 | 0.7 | 5.1 | 800 | |
| | | | | | | 168 | 0.9 | 5.2 | 680 | |
| Ex. 7 | " | " | 2.0 | " | 1.0 | 8 | 0.1 | 0.7 | 780 | |
| | | | | | | 24 | 0.8 | 6.0 | 730 | |
| | | | | | | 48 | 1.5 | 7.0 | 530 | |
| | | | | | | 72 | 1.6 | 7.3 | 510 | |
| | | | | | | 168 | 2.9 | 10.5 | 320 | |
| Ex. 8 | " | " | 2.2 | " | 0.8 | 8 | 0.1 | 0.6 | 760 | |
| | | | | | | 24 | 0.7 | 6.2 | 740 | |
| | | | | | | 48 | 1.3 | 6.2 | 580 | |
| | | | | | | 72 | 1.4 | 7.5 | 500 | |
| | | | | | | 168 | 2.9 | 10.3 | 330 | |
| Ex. 9 | 10,300 | 3,000 | 1.5 | 0.2 | 1.2 | 8 | 0.4 | 3.5 | 680 | |
| | | | | | | 24 | 2.3 | 16.0 | 650 | |
| | | | | | | 48 | 3.9 | 17.4 | 520 | |
| | | | | | | 72 | 5.9 | 18.1 | 380 | |
| | | | | | | 168 | 9.5 | 22.0 | 290 | |
| Ex. 10 | 10,100 | 1,000 | " | " | " | 8 | 0.5 | 3.6 | 670 | |
| | | | | | | 24 | 2.8 | 17.5 | 610 | |
| | | | | | | 48 | 4.5 | 18.9 | 530 | |
| | | | | | | 72 | 6.4 | 21.0 | 380 | |
| | | | | | | 168 | 10.9 | 24.2 | 300 | |
| CEx. 1 | 15,000 | 3,000 | 3.0 | — | — | 8 | ~0 | ~0 | ~0 | Elongation at the initial stage was low. |
| | | | | | | 24 | ~0 | ~0 | 80 | |
| | | | | | | 48 | ~0 | 0.1 | 60 | |
| | | | | | | 72 | 0.9 | 1.3 | 110 | |
| | | | | | | 168 | 2.8 | 8.5 | 230 | |
| CEx. 2 | " | " | 1.8 | 0 | 1.2 | 8 | 0.3 | 1.8 | 630 | Elongation at the initial stage was low. |
| | | | | | | 24 | 1.2 | 6.9 | 570 | |
| | | | | | | 48 | 1.8 | 7.5 | 430 | |
| | | | | | | 72 | 2.5 | 7.2 | 390 | |
| | | | | | | 168 | 3.5 | 9.2 | 200 | |
| CEx. 3 | " | " | 1.8 | 1.0 | 1.2 | 8 | ~0 | ~0 | ~0 | Elongation at the initial stage was low. |
| | | | | | | 24 | ~0 | ~0 | ~0 | |
| | | | | | | 48 | ~0 | ~0 | ~0 | |
| | | | | | | 72 | 0.5 | 1.0 | 690 | |
| | | | | | | 168 | 1.4 | 0.5 | 530 | |
| CEx. 4 | 3,800 | 1,000 | 1.2 | 0.2 | 1.1 | 8 | 0.8 | 1.0 | 160 | Hard, and elongation was low. |
| | | | | | | 24 | 3.6 | 7.7 | 100 | |
| | | | | | | 48 | 5.8 | 8.8 | 80 | |
| | | | | | | 72 | 7.0 | 8.9 | 70 | |

Table 1-continued

| Example (Ex.) or Comparative Example (CEx.) | Diamine (A) Molecular weight | Molecular weight of R | Diepoxide (B) Mole ratio of epoxy groups to primary amino groups | Esters (C) Mole Ratio of acryloyl groups in the diester to entire acryloyl groups | Mole Ratio of acryloyl groups to primary amino groups | Aging time (hr) | Properties during curing M₅₀ (kg/cm²) | Tb (kg/cm²) | Eb (%) | |
|---|---|---|---|---|---|---|---|---|---|---|
| | | | | | | 168 | — | 12.0 | 40 | |
| | | | | | | 2 | — | 5.3 | less than 10 | |
| CEx. 5 | C₆H₁₈N₄ (MW = 146) | — | 2.0 | " | 1.0 | 8 | — | 12.0 | less than 10 | Hard, and elongation was low. |
| CEx. 6 | 15,000 | 3,000 | 0.4 | 0.2 | 1.2 | — | — | — | | Did not completely cure. The surface was very tacky. |
| CEx. 7 | " | " | 9.0 | " | " | — | — | — | | Elongation at the last stage was small; hard. |
| CEx. 8 | 35,000 | " | 2.7 | " | 1.5 | — | — | — | | Curing was slow. |
| CEx. 9 | 15,000 | " | 2.9 | " | 0.06 | — | — | — | | Curing was slow. |
| CEx. 10 | " | " | 1.8 | " | 4.0 | — | — | — | | Curing was slow. |

EXAMPLE 11

A curing agent was prepared from 1.8 g of an epoxy resin (EPOMIK R-140), 0.8 g of an acrylate ester (ARONIX M-8030), 0.4 g of an acrylate ester (ARONIX M-6100), 3 g of an age-resister, 3.4 g of calcium stearate and 0.4 g of phenyl glycidyl ether. The curing agent was well mixed with the basic composition obtained in Example 1, and a 2 mm-thick sheet was prepared from the mixture. The sheet was allowed to stand at room temperature for 7 days, and then heated at 50° C. for 7 days. The tensile strength and elongation of the sheet were measured in accordance with JIS A-6301, and its tack-free time and ozone resistance were measured in accordance with JIS A-5757.

EXAMPLE 12

A curing agent was prepared from 1.5 g of an epoxy resin (EPOMIK R-140), 0.8 g of an acrylate ester (ARONIX M-8030), 0.4 g of an acrylate ester (ARONIC M-6100), 3 g of an age-resister, 3.4 g of calcium carbonate and 0.6 g of phenyl glycidyl ether. The curing agent was well mixed with the basic composition obtained in Example 1, and the composition was tested in the same way as in Example 11.

EXAMPLE 13

A curing agent was prepared from 1.2 g of an epoxy resin (EPOMIK R-140), 0.8 g of an acrylate ester (ARONIX M-8030), 0.4 g of an acrylate ester (ARONIX M-6100), 3 g of an age-resister, 3.4 g of calcium carbonate and 0.9 g of phenyl glycidyl ether. The curing agent was mixed with the basic composition obtained in Example 1, and the composition was tested in the same way as in Example 11.

The results obtained in Examples 11 to 13 and other data together with those obtained in Example 1 are shown in Table 2.

Table 2

| Example | Diepoxide Mole ratio of epoxy groups to primary amino groups | Esters Mole ratio of acryloyl groups in the diester to entire acryloyl groups | Mole ratio of acryloyl groups to primary amino groups | Monoepoxide Mole ratio of epoxy groups to primary amino groups | Properties of the cured product M₅₀ (kg/cm²) | Tb (kg/cm²) | Eb (%) | Tack-free time (sec.) | Ozone resistance |
|---|---|---|---|---|---|---|---|---|---|
| 11 | 1.4 | 0.2 | 1.2 | 0.4 | 1.8 | 14.3 | 520 | 15 | Good |
| 12 | 1.2 | 0.2 | 1.2 | 0.6 | 1.6 | 13.8 | 580 | 15 | Good |
| 13 | 0.9 | 0.2 | 1.2 | 0.9 | 1.2 | 13.3 | 780 | 16 | Good |
| 1 | 1.8 | 0.2 | 1.2 | 0 | 1.7 | 15.0 | 520 | 19 | Cracks occurred owing to ozone |

EXAMPLE 14

Into a flask equipped with three propeller blades were placed 100 parts by weight of urethane diamine having a molecular weight of 9,400 and 2 parts by weight of polyoxyethylene nonylphenyl ether having an HLB (hydrophilic-lipophilic balance) of 13 as an emulsifier. They were well mixed, and then 22 parts by weight of a 0.2 N aqueous solution of hydrochloric acid was added to adjust the pH of the mixture to 9.0. Then, 78 parts of water and 80 parts of calcium carbonate were added, and the mixture was stirred for 30 minutes at a stirring speed of 500 rpm to form a basic paste (A). Separately, a flask equipped with three propeller blades was charged with 52 parts by weight of an epoxy resin (EPOMIK R-140), 17 parts by weight of an acrylate ester (ARONIX M-8030), 31 parts by weight of an acrylate ester (ARONIX M-6100) and 3 parts by weight of polyoxyethylenepolyoxypropylene glycol (Nissan Pronon 208, a trademark for a product of Nippon Yushi Co., Ltd.) as an emulsifier. They were stirred from 5 minutes at a speed of 500 rpm at 60° C. Then, 10 parts by weight of a 5% aqueous solution of polyvinyl alcohol, and subsequently 87 parts by weight of water were added. The mixture was further stirred for 10 minutes, and cooled to form a curing agent emulsion (B).

100 Parts by weight of (A) and 5.8 parts by weight of (B) were well mixed, and the mixture was sprayed by a mortar gun against a sheet-molded dish coated with a mold releasing agent to form a sheet having a thickness of 2 mm. No. 3 dumbbell samples specified in JIS K-6301 were prepared from the sheet. The relation of the aging time at 25° C. to tensile strength and elongation was examined. The tensile test was performed by using an autograph at a pulling speed of 500 mm/min. at 25° C.

EXAMPLE 15

A curing agent was prepared from 43 parts by weight of an epoxy resin (EPOMIK R-140), 20 parts by weight of an acrylate ester (ARONIX M-8030), 37 parts by weight of an acrylate ester (ARONIX M-6100), 3 parts by weight of an emulsifier (Nissan Pronon 208), 10 parts by weight of a 5% aqueous solution of polyvinyl alcohol, and 87 parts by weight of water. The curing agent was well mixed with the basic composition obtained in Example 14 with the mixing ratio of the basic composition to the curing agent being 4.9:1, and the composition was tested in the same way as in Example 14.

The results obtained in Examples 14 and 15 and other data are shown in Table 3 below.

Table 3

| Example | Diepoxide Mole ratio of epoxy groups to primary amino groups | Esters Mole ratio of acryloyl groups in the diester to entire acryloyl groups | Mole ratio of acryloyl groups to primary amino groups | Aging time (hr) | Properties during curing $M_{50}$ (kg/cm²) | $T_b$ (kg/cm²) | $E_b$ (%) |
|---|---|---|---|---|---|---|---|
| 14 | 1.0 | 0.5 | 1.0 | 8 | 1.0 | 3.5 | 1300 |
|    |     |     |     | 24 | 4.9 | 14.0 | 800 |
|    |     |     |     | 168 | 9.1 | 19.1 | 450 |
| 15 | 0.7 | 0.5 | 1.0 | 8 | 1.3 | 4.6 | 1300 |
|    |     |     |     | 24 | 4.7 | 13.7 | 780 |
|    |     |     |     | 168 | 7.9 | 18.0 | 580 |

What we claim is:
1. An elastic composition curable at room temperature comprising
(A) a diamine having a molecular weight of about 5,000 to about 25,000 and expressed by the following formula

wherein R is a residue of a long-chain diol having a molecular weight of about 500 to about 15,000, R' is a group selected from the group consisting of alkylene, cycloalkylene and arylene, and n is an integer of 1 to 25,
(B) a diepoxy compound in an amount such that the ratio of the moles of epoxy groups in the diepoxy compound to the moles of primary amino groups in the diamine (A) is from 0.5 to 5.0,
(C) a mixture of (i) a diacrylic acid ester and/or a dimethacrylic acid ester and (ii) a tri- or higher-polyacrylic acid and/or a tri- or higher polymethacrylic acid ester in which 5 to 90% of the acryloyl and/or methacryloyl groups are derived from the diacrylic and/or dimethacrylic acid ester, the amount of said mixture being such that the ratio of the total moles of the acryloyl and methacryloyl groups in the mixture to the moles of primary amino groups in the diamine (A) is from 0.1 to 2.0,
(D) 0 to about 300 parts by weight, per 100 parts by weight of the total of the diamine (A), diepoxy compound (B) and mixture (C), of an inorganic filler,
(E) a monoepoxy compound in an amount of 0 to 25 moles per mole of the primary amino groups in the diamine (A),
(F) 0 to about 30 parts by weight, per 100 parts by weight of the total of the diamine (A), diepoxy compound (B) and mixture (C), of a curing promotor,
(G) 0 to about 100 parts by weight, per 100 parts by weight of the total of the diamine (A), diepoxy compound (B) and mixture (C), of a viscosity controlling agent,
(H) 0 to about 300 parts by weight, per 100 parts by weight of the total of the diamine (A), diepoxy compound (B) and mixture (C), of an organic filler,
(I) 0 to about 30 parts by weight, per 100 parts by weight of the total of the diamine (A), diepoxy compound (B) and mixture (C), of an age-resister.
(J) 0 to about 30 parts by weight, per 100 parts by weight of the total of the diamine (A), diepoxy compound (B) and mixture (C), of a sag inhibitor,
(K) 0 to about 30 parts by weight, per 100 parts by weight of the total of the diamine (A), diepoxy compound (B) and mixture (C), of an ultraviolet absorbent and
(L) 0 to about 10 parts by weight, per 100 parts by weight of the total of the diamine (A), diepoxy compound (B) and mixture (C), of an assistant sag inhibitor.
2. The composition of claim 1 wherein R in the formula representing the diamine (A) is a polyoxyalkylene glycol having a molecular weight of about 500 to about 15,000 and R' represents a $C_2$-$C_{12}$ alkylene group.

3. The composition of claim 1 wherein the amount of the inorganic filler (D) is about 20 to about 200 parts by weight per 100 parts by weight of the total of the diamine (A), diepoxy compound (B) and mixture (C).

4. The composition of claim 1 wherein the amount of the monoepoxy compound (E) is 0.05 to 2.5 moles per mole of the primary amino groups of the diamine (A).